US011549190B2

(12) United States Patent
Saito et al.

(10) Patent No.: US 11,549,190 B2
(45) Date of Patent: Jan. 10, 2023

(54) ALUMINUM MEMBER AND METHOD OF MANUFACTURING ALUMINUM MEMBER

(71) Applicant: UACJ CORPORATION, Tokyo (JP)

(72) Inventors: Syu Saito, Tokyo (JP); Junji Nunomura, Tokyo (JP)

(73) Assignee: UACJ CORPORATION, Tokyo (JP)

( * ) Notice: Subject to any disclaimer, the term of this patent is extended or adjusted under 35 U.S.C. 154(b) by 0 days.

(21) Appl. No.: 17/160,220

(22) Filed: Jan. 27, 2021

(65) Prior Publication Data

US 2021/0147997 A1    May 20, 2021

Related U.S. Application Data

(63) Continuation of application No. PCT/JP2019/027143, filed on Jul. 9, 2019.

(30) Foreign Application Priority Data

Jul. 31, 2018  (JP) .............................. JP2018-143502

(51) Int. Cl.
   *B32B 15/20*    (2006.01)
   *C25D 9/06*     (2006.01)
   *C25D 11/08*    (2006.01)

(52) U.S. Cl.
   CPC ............... *C25D 9/06* (2013.01); *B32B 15/20* (2013.01); *C25D 11/08* (2013.01)

(58) Field of Classification Search
   CPC .................................................... B32B 15/20
   USPC ........................................................ 428/629
   See application file for complete search history.

(56) References Cited

U.S. PATENT DOCUMENTS

| | | | |
|---|---|---|---|
| 9,512,537 B2 | 12/2016 | Curran et al. | |
| 10,760,175 B2 | 9/2020 | Tatebe et al. | |
| 10,781,529 B2 | 9/2020 | Tatebe et al. | |
| 2008/0093223 A1 | 4/2008 | Yoshioka et al. | |
| 2017/0121836 A1 | 5/2017 | Tatebe et al. | |
| 2017/0121837 A1 | 5/2017 | Tatebe et al. | |
| 2017/0121838 A1 | 5/2017 | Tatebe et al. | |

FOREIGN PATENT DOCUMENTS

| | | | |
|---|---|---|---|
| JP | 2002119856 A | | 4/2002 |
| JP | 3575150 B2 | | 10/2004 |
| JP | 2012241226 A | | 12/2012 |
| JP | 2014098200 A | * | 5/2014 |
| JP | 3209960 U | | 3/2017 |

(Continued)

OTHER PUBLICATIONS

Dong et al., JP 20140/098200 A Google Patents machine translation, May 29, 2014, entire translation (Year: 2014).*

(Continued)

*Primary Examiner* — Humera N. Sheikh
*Assistant Examiner* — Katherine A Christy
(74) *Attorney, Agent, or Firm* — Dorsey & Whitney LLP

(57) ABSTRACT

The present disclosure relates to an aluminum member including a mother material containing aluminum or an aluminum alloy, and an anodic oxide film on the surface of the mother material. The anodic oxide film has a barrier layer on the surface of the mother material, and a porous layer on the barrier layer), and the BET specific surface area of the anodic oxide film is 0.1 to 10.0 m²/g.

11 Claims, 2 Drawing Sheets

(56) References Cited

FOREIGN PATENT DOCUMENTS

| | | | |
|---|---|---|---|
| JP | 2017075383 A | 4/2017 | |
| JP | 3211272 U | 6/2017 | |
| JP | 2018531325 A | 10/2018 | |
| WO | 2005118919 A1 | 12/2005 | |
| WO | WO-2012157164 A1 * | 11/2012 | ............. C25D 11/04 |

OTHER PUBLICATIONS

English translation of Decision to Grant a Patent for JP Application No. 2018-143502, dated Aug. 5, 2019.
English translation of International Preliminary Report on Patentability for Application No. PCT/JP2019/027143, dated Feb. 2, 2021.
English translation of International Search Report and Written Opinion for Application No. PCT/JP2019/027143, dated Aug. 13, 2019.
English translation of Notice of Reasons for Refusal for JP Application No. 2018-143502, dated Jul. 1, 2019.
Saffari, Hamid et al., "Optimal Condition for Fabrication Superhydrophobic Aluminum Surfaces With Controlled Anodizing Processes", Applied Surface Science [online], vol. 435, Nov. 24, 2017, pp. 1322-1328.
[English Translation] Notice of Reasons for Refusal dated Mar. 29, 2022 for Korean Patent Application No. 10-2021-7001897; pp. all.
[English Translation] Written Decision on Registration dated Sep. 21, 2022 in KR Application No. 10-2021-7001897; pp. all.

* cited by examiner

ALUMINUM MEMBER AND METHOD OF MANUFACTURING ALUMINUM MEMBER

CROSS REFERENCE TO RELATED APPLICATIONS

The present application is a continuation application of International Patent Application No. PCT/JP2019/027143 filed on Jul. 9, 2019, which claims the benefit of Japanese Patent Application No. 2018-143502, filed on Jul. 31, 2018. The contents of these applications are incorporated herein by reference in their entirety.

BACKGROUND

Technical Field

The present disclosure relates to an aluminum member and a method of manufacturing the aluminum member, and particularly relates to an aluminum member which is obtained by a simple primary treatment without the need for a complicated step of a secondary or higher treatment, which has high whiteness, and in which unevenness in white color is suppressed, and a method of manufacturing the aluminum member.

Description of the Related Art

An aluminum member having an opaque white color is desired in applications in which weight reduction and designability are required, such as building materials, and housings for electronic devices. However, the opaque white color is a color tone that is difficult to achieve by general dying and coloring methods which are applied in anodic oxidation treatments on aluminum members. Accordingly, production of an aluminum-based material having an opaque white color has been studied.

Aluminum hydroxide having a specified BET specific surface area and having high whiteness is disclosed in Japanese Patent No. 3575150. However, in Japanese Patent No. 3575150, the object of whiteness is neither pure aluminum nor an aluminum alloy, but is aluminum hydroxide. Further, in Japanese Patent No. 3575150, controlling the BET specific surface area for the purpose of adjusting the content of physically adsorbed water on the surface of an aluminum hydroxide powder is described, but how an improvement in whiteness is achieved is not referred to.

On the other hand, a technique of enhancing the BET specific surface area of anodized aluminum which is obtained by sequentially performing an acid treatment step, a post-hydration treatment step, and a calcination step after anodically oxidizing an aluminum surface is disclosed in Japanese Patent Application Laid-open No. 2002-119856. However, anodized aluminum having an enhanced BET specific surface area is described, but whiteness is not referred to in Japanese Patent Application Laid-Open No. 2002-119856. Further, in the technique described in Japanese Patent Application Laid-Open No. 2002-119856, a complicated step of a secondary or higher treatment is needed for the purpose of obtaining a desired BET specific surface area. Therefore, development of a method of manufacturing an aluminum member having high whiteness by simpler steps than in the conventional techniques is desired. Further, it is preferable to suppress unevenness in white color of an aluminum member as much as possible and to be excellent in appearance characteristics from the viewpoint of designability.

SUMMARY

The present disclosure is related to providing an aluminum member which is obtained by a simple primary treatment, which has high whiteness, and in which unevenness in white color is suppressed, and a method of manufacturing the aluminum member.

An aspect of the present disclosure is an aluminum member including a mother material containing aluminum or an aluminum alloy; and an anodic oxide film on the surface of the mother material, wherein the anodic oxide film has a barrier layer on the surface of the mother material, and a porous layer on the barrier layer, and a BET specific surface area of the anodic oxide film is 0.1 to 10.0 m$^2$/g.

In one embodiment of the present disclosure, a Hunter whiteness of the aluminum member, measured from a surface side of the anodic oxide film, is 65 or more.

Another aspect of the present disclosure is a method of manufacturing an aluminum member including a step of preparing a mother material containing aluminum or an aluminum alloy; and a step of performing an anodic oxidation treatment on the mother material in an electrolytic solution containing (a) a first acid being an inorganic acid or a salt of the first acid; and (b) at least one second acid selected from the group consisting of diphosphoric acid, triphosphoric acid, and polyphosphoric acid, or a salt of the second acid.

In one embodiment of the present disclosure, in the step of performing the anodic oxidation treatment, a concentration of the first acid or a salt of the first acid in the electrolytic solution is 0.005 to 7.0 mol·dm$^{-3}$, and a concentration of the second acid or a salt of the second acid in the electrolytic solution is 0.005 to 10.0 mol·dm$^{-3}$.

In one embodiment of the present disclosure, in the step of performing the anodic oxidation treatment, a current density is 2 to 150 mA·cm$^{-2}$, and an electrolysis time is 10 to 700 minutes.

According to the present disclosure, an aluminum member which is obtained by a simple primary treatment and has high whiteness, and a method of manufacturing the aluminum member can be provided.

DETAILED DESCRIPTION

Figure 1:
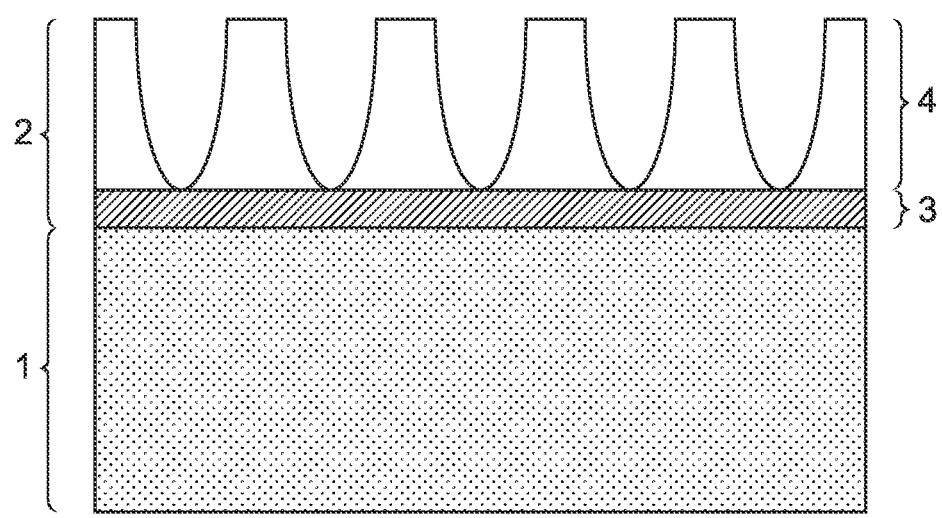
FIG. 1 is an outline diagram schematically showing one embodiment of an aluminum member of the present disclosure.

Hereinafter, embodiments of the present disclosure will be described. Note that the present disclosure is not limited to the following embodiments and can be carried out in various aspects in a range not deviating from the gist of the present disclosure.

<Aluminum Member>

An aluminum member of the present disclosure includes a mother material, and an anodic oxide film on the surface of the mother material. Hereinafter, components of the aluminum member of one embodiment will be described.

(Mother Material)

The mother material contains aluminum or an aluminum alloy, and can appropriately be selected according to the applications of the aluminum member. For example, it is preferable that the mother material is 5000 series aluminum alloy or 6000 series aluminum alloy from the viewpoint of enhancing the strength of the aluminum member. In addition, it is preferable that the mother material is 1000 series aluminum alloy or 6000 series aluminum alloy in which coloration due to the anodic oxidation treatment is unlikely to occur from the viewpoint of enhancing the whiteness of the aluminum member after the anodic oxidation treatment more.

(Anodic Oxide Film)

The anodic oxide film has a barrier layer formed on the surface of the mother material, and a porous layer formed on the barrier layer. It is preferable that the thickness of the anodic oxide film is, but not particularly limited to, 100 μm or less, and more preferably 80 μm or less. When the thickness of the anodic oxide film exceeds 100 μm, there is a tendency that the electrolysis time is made long, and therefore lowering of productivity is brought about, and unevenness accompanying nonuniform growth occurs, resulting in a defective appearance.

It is preferable that the thickness of the barrier layer is, but not particularly limited to, 10 to 150 nm from the viewpoint of suppressing coloration due to interference to enhance the whiteness more.

The porous layer has first pores and second pores. The first pores extend from the boundary between the porous layer and the barrier layer to the thickness direction of the porous layer. In this way, the first pores lie on the barrier layer side of the porous layer (at the boundary between the porous layer and the barrier layer, and in the vicinity of the boundary) and extends to the thickness direction of the porous layer (the direction approximately perpendicular to the surface of the mother material).

The second pores are communicated with the first pores and extend in such a way as to branch radially toward the surface of the porous layer in the thickness direction of the porous layer. That is, as the second pores get close to the surface of the porous layer, one or more pores extend by branching radially in certain angles from one pore, and one or more pores further extend by branching in certain angles from these pores, and in this way, the second pores exist in such a way that one or more pores, which branch from one pore, spread in a certain angle range. The second pores stretch by spreading in an inverted dendroid form along the thickness direction of the porous layer toward the surface of the porous layer. In this way, the second pores lie on the surface side of the porous layer (at the surface of the porous layer and in the vicinity of the surface of the porous layer). Note that "the surface of the porous layer" means a surface opposite to a surface in contact with the barrier layer of the two surfaces of the porous layer, facing each other. Therefore, when the porous layer is observed from a section parallel with the thickness direction of the porous layer, the first pores and the second pores exist in the mentioned order from the mother material side toward the surface side of the porous layer.

It is preferable that the thickness of the porous layer is, but not particularly limited to, 6 μm or more and less than 100 μm, more preferably 8 to 75 μm, and still more preferably 10 to 50 μm. When the thickness of the porous layer is less than 6 μm, the diffusion of light due to irregular reflection is insufficient, and therefore the anodic oxide film is easily made transparent. When the anodic oxide film is transparent, the color tone of the aluminum member as a whole is near the color tone of the mother material, making it difficult to obtain desired whiteness. Note that the upper limit value of the thickness of the porous layer of less than 100 μm is based on the upper limit value of the anodic oxide film of 100 μm.

FIG. 1 is an outline diagram schematically showing one embodiment of the aluminum member of the present disclosure. As shown in FIG. 1, an anodic oxide film 2 is formed on the surface of a mother material 1 containing aluminum or an aluminum alloy. The anodic oxide film 2 has a barrier layer 3 formed on the surface of the mother material 1, and a porous layer 4 formed on the barrier layer 3. Note that FIG. 1 is an outline diagram, and therefore the pore structure of the porous layer 4 is schematically shown. Therefore, the first pores and the second pores actually exist in the porous layer 4 in FIG. 1, but the structures of the first pores and the second pores are not shown in FIG. 1.

(Specific Surface Area)

The BET specific surface area of the anodic oxide film is 0.1 to 10.0 $m^2/g$, more preferably 0.5 to 8.0 $m^2/g$, and still more preferably 1.0 to 6.0 $m^2/g$. When the BET specific surface area is smaller than 0.1 $m^2/g$, visible light is easily transmitted in the anodic oxide film, so that sufficient whitening of the aluminum member cannot be achieved, and unevenness in white color easily occurs a lot. On the other hand, when the BET specific surface area is larger than 10.0 $m^2/g$, visible light cannot be irregularly reflected in a sufficient manner, and similarly sufficient whitening of the aluminum member cannot be achieved either, and unevenness in white color also occurs a lot. By more strictly controlling the BET specific surface area, the whiteness can be enhanced more, and further, the unevenness in white color can also be suppressed more.

It is preferable that the Hunter whiteness of the aluminum member, measured from the surface side of the anodic oxide film, is 65 or more, more preferably 70 or more, still more preferably 75 or more, and particularly preferably 80 or more. The Hunter whiteness refers to a numerical value which is obtained in accordance with the standard of JIS P8123 and is a numerical value measured by the test method for Hunter whiteness. When this numerical value is closer to 100, it means that the aluminum member has higher whiteness (opaque whiteness). When the Hunter whiteness of the aluminum member is 65 or more, thereby the aluminum member has a desired opaque white color, and excellent designability can be imparted to the aluminum member.

<Method of Manufacturing Aluminum Member>

A method of manufacturing an aluminum member of the present disclosure includes a step of preparing a mother material; and a step of performing an anodic oxidation treatment on the mother material in a particular electrolytic solution. That is, when the predetermined anodic oxidation treatment as a primary treatment is performed, an aluminum member having desired high whiteness can be made without further performing a secondary treatment and a tertiary treatment, such as further use of an electrolytic solution different from the primary treatment, and other complicated treatments subsequent to the anodic oxidation treatment. In this way, an aluminum member having high whiteness can be provided by a simple primary treatment in the method of manufacturing an aluminum member of the present disclosure, and therefore the aluminum member having high whiteness can be produced more efficiently. Hereinafter, each step in the method of manufacturing an aluminum member of one embodiment will be described in detail.

(Step of Preparing Mother Material)

At first, the mother material containing aluminum or an aluminum alloy is prepared. Examples of the aluminum alloy include, but not particularly limited to, 1000 series aluminum alloy, 5000 series aluminum alloy, or 6000 series aluminum alloy as described above.

(Step of Performing Anodic Oxidation Treatment on Mother Material)

The anodic oxidation treatment is performed on the mother material in an electrolytic solution containing: (a) a first acid being an inorganic acid or a salt of the first acid; and (b) at least one second acid selected from the group consisting of diphosphoric acid, triphosphoric acid, and polyphosphoric acid, or a salt of the second acid. By the anodic oxidation treatment, the anodic oxide film including a barrier layer having a predetermined thickness on the surface of the mother material; and a porous layer having a predetermined thickness on the barrier layer and having first pores and second pores is formed. Note that the first pores are pores which lie on the barrier layer side and extend in the thickness direction of the porous layer. The second pores are pores which lie on the surface side of the porous layer and extend in such a way as to branch radially in the thickness direction of the porous layer toward the surface of the porous layer.

The first acid being an inorganic acid or a salt of the first acid is used for forming and dissolving the film on the recessed part of the barrier layer surface and has a function of forming pores extending in the thickness direction of the anodic oxide film. On the other hand, the at least one second acid selected from the group consisting of diphosphoric acid, triphosphoric acid, and polyphosphoric acid, or a salt of the second acid has a function of forming a structure extending in a fiber form on the wall surface of the recessed part. It is considered that by using the electrolytic solution containing both of a particular first acid or a salt of the particular first acid and a particular second acid or a salt of the particular second acid in this way in the anodic oxidation treatment, these substances act synergistically and the porous layer having the first pores and the second pores is formed. Thereby, the BET specific surface area of the anodic oxide film can be controlled into a predetermined range, and as a result, the aluminum member having high whiteness can be made by the primary treatment by use of the anodic oxidation treatment.

It is preferable that the inorganic acid as the first acid is selected from, but not particularly limited to, the group consisting of sulfurous acid, sulfuric acid, thiosulfuric acid, and disulfuric acid, and it is preferable that the salt of such an inorganic salt is at least one sulfate selected from the group consisting of sodium sulfate, ammonium sulfate, and sodium thiosulfate.

It is preferable that the second acid selected from the group consisting of diphosphoric acid, triphosphoric acid, and polyphosphoric acid, or a salt of the second acid is, but not particularly limited to, an acid anhydride of diphosphoric acid, triphosphoric acid, or polyphosphoric acid, and besides, as the salt of any of these acid anhydrides, at least one phosphate selected from the group consisting of sodium phosphate, sodium pyrophosphate, potassium pyrophosphate, and sodium metaphosphate. Among these acid anhydrides and the salts of the acid anhydrides, it is preferable that the second acid or a salt of the second acid is at least one phosphoric acid selected from the group consisting of diphosphoric acid, triphosphoric acid, and polyphosphoric acid from the viewpoint of capable of stably forming the second pores having a regular shape.

It is preferable that the concentration of the first acid or a salt of the first acid in the electrolytic solution is 0.005 to 7.0 mol·dm$^{-3}$, more preferably 0.01 to 2.0 mol·dm$^{-3}$, and still more preferably 0.05 to 1.5 mol·dm$^{-3}$. When the concentration of the first acid or a salt of the first acid is less than 0.005 mol·dm$^{-3}$, there is a tendency that the anodic oxidation treatment on the mother material cannot be performed efficiently, and on the other hand, when the concentration of the first acid or a salt of the first acid exceeds 7.0 mol·dm$^{-3}$, the dissolution power of the electrolytic solution is enhanced, making it difficult to grow the film of the porous layer in some cases.

It is preferable that the concentration of the second acid or a salt of the second acid in the electrolytic solution is 0.005 to 10.0 mol·dm$^{-3}$, and more preferably 0.01 to 5.0 mol·dm$^{-3}$. When the concentration of the second acid or a salt of the second acid is less than 0.005 mol·dm$^{-3}$, there is a tendency that the second pores cannot be formed in the porous layer, and on the other hand, when the concentration of the second acid or a salt of the second acid exceeds 10.0 mol·dm$^{-3}$, it becomes difficult to form the second pores periodically in the porous layer, so that there is a risk that the porous layer is made thin. Therefore, by controlling the concentration of the second acid or a salt of the second acid in the range of 0.005 to 10.0 mol·dm$^{-3}$, the porous layer can sufficiently be grown to a certain thickness, the second pores can be formed periodically on the porous layer, and the whiteness of the aluminum member can thereby be improved more.

It is preferable that the current density during the anodic oxidation treatment is 2 to 150 mA·cm$^{-2}$, more preferably 5 to 50 mA·cm$^{-2}$, still more preferably 5 to 30 mA·cm$^{-2}$, and particularly preferably 10 to 20 mA·cm$^{-2}$. When the current density is 2 mA·cm$^{-2}$ or more, thereby the film-forming rate of the porous layer can be increased, and the anodic oxide film having a sufficient thickness can be obtained. When the current density is 150 mA·cm$^{-2}$ or less, the anodic oxidation reaction thereby occurs uniformly. Thereby, burning, unevenness in white color, and the like to the anodic oxide film can efficiently be suppressed.

It is preferable that the temperature (liquid temperature) of the electrolytic solution during the anodic oxidation treatment is 0 to 80° C., and more preferably 20 to 60° C. When the temperature of the electrolytic solution is 0° C. or higher, the second pores are thereby made easily formed in the porous layer. When the temperature of the electrolytic solution is 80° C. or lower, thereby the porous layer dissolves at a moderate rate, and the growth of the porous layer is facilitated to make the film thickness of the anodic oxide film thick, so that the whiteness of an aluminum member can be improved.

It is preferable that the electrolysis time during the anodic oxidation treatment is 10 to 700 minutes, more preferably 10 to 600 minutes, still more preferably 20 to 300 minutes, and particularly preferably 30 to 120 minutes. When the electrolysis time is less than 10 minutes, there is a tendency that the film thickness of the anodic oxide film is thin and an anodic oxide film having a desired thickness is not obtained, and on the other hand, it is not preferable that the electrolysis time exceeds 700 minutes because the film thickness cannot be made thick in principle, and the production efficiency is made poor.

If necessary, a substrate treatment, such as a degreasing treatment or a polishing treatment, may be performed on the mother material before the anodic oxidation treatment is performed. For example, by performing an alkaline degreasing treatment as the substrate treatment, the gloss value of the anodic oxide film can be lowered and the aluminum member exhibiting a white color without gloss can be obtained. On the other hand, by performing a polishing treatment, such as chemical polishing, mechanical polishing, or electrolytic polishing, as the substrate treatment, the gloss value of the anodic oxidation treatment can be enhanced and an aluminum member having a white color with gloss can be obtained. It is preferable to perform an electrolytic polishing treatment on the mother material before the anodic oxidation treatment is performed from the viewpoint of enhancing the whiteness and the gloss value of the aluminum member more. If necessary, a post-treatment, such as a sealing treatment, may be performed after the anodic oxidation treatment is performed on the mother material.

EXAMPLES

Hereinafter, the present disclosure will be described in detail based on Examples, but the present disclosure is not limited to these Examples.

Examples 1 to 32 and Comparative Examples 1 to 3

Mother materials which are raw materials for aluminum members were prepared, and anodic oxidation treatments were performed on the mother materials in predetermined electrolytic solutions under the conditions shown in Table 1 below, thereby manufacturing aluminum members of Examples 1 to 32 and Comparative Examples 1 to 3. Note that anodic oxidation treatments were performed on aluminum members of Examples 1 to 32 and Comparative Examples 2 and 3 under the conditions of 10 minutes or longer with respect to the electrolysis time in such a way that the thickness of each anodic oxide film was 100 μm or less. "1100" described as the type of mother material alloy in Table 1 is 1000 series aluminum alloy, and "6063" is 6000 series aluminum alloy.

TABLE 1

| | Type of mother material alloy | Substrate treatment | First acid or salt of first acid | | Second acid or salt of second acid | | Anodic oxidation treatment | | |
|---|---|---|---|---|---|---|---|---|---|
| | | | Material | Concentration (mol · dm$^{-3}$) | Material | Concentration (mol · dm$^{-3}$) | Liquid temperature (° C.) | Current density (mA · cm$^{-2}$) | Electrolysis time (minutes) |
| Example 1 | 1100 | Alkaline degreasing | Sulfuric acid | 0.5 | Diphosphoric acid | 0.2 | 20 | 10 | 60 |
| Example 2 | 1100 | Alkaline degreasing | Thiosulfuric acid | 0.5 | Diphosphoric acid | 0.2 | 20 | 10 | 60 |
| Example 3 | 1100 | Alkaline degreasing | Sodium sulfate | 0.5 | Diphosphoric acid | 0.2 | 20 | 10 | 60 |
| Example 4 | 1100 | Alkaline degreasing | Sulfuric acid | 0.5 | Triphosphoric acid | 0.2 | 60 | 150 | 60 |
| Example 5 | 1100 | Alkaline degreasing | Sulfuric acid | 0.5 | Polyphosphoric acid | 0.2 | 60 | 150 | 60 |
| Example 6 | 1100 | Alkaline degreasing | Sulfuric acid | 0.005 | Diphosphoric acid | 0.2 | 20 | 10 | 60 |
| Example 7 | 1100 | Alkaline degreasing | Sulfuric acid | 0.01 | Diphosphoric acid | 0.2 | 20 | 10 | 60 |
| Example 8 | 1100 | Alkaline degreasing | Sulfuric acid | 0.05 | Diphosphoric acid | 0.2 | 20 | 10 | 60 |
| Example 9 | 1100 | Alkaline degreasing | Sulfuric acid | 1.5 | Diphosphoric acid | 0.2 | 20 | 10 | 60 |
| Example 10 | 1100 | Alkaline degreasing | Sulfuric acid | 2 | Diphosphoric acid | 0.2 | 20 | 10 | 60 |
| Example 11 | 1100 | Alkaline degreasing | Sulfuric acid | 7 | Diphosphoric acid | 0.2 | 20 | 10 | 60 |
| Example 12 | 1100 | Alkaline degreasing | Sulfuric acid | 0.5 | Diphosphoric acid | 0.005 | 20 | 10 | 60 |
| Example 13 | 1100 | Alkaline degreasing | Sulfuric acid | 0.5 | Diphosphoric acid | 0.01 | 20 | 10 | 60 |
| Example 14 | 1100 | Alkaline degreasing | Sulfuric acid | 0.5 | Diphosphoric acid | 0.1 | 20 | 10 | 60 |
| Example 15 | 1100 | Alkaline degreasing | Sulfuric acid | 0.5 | Diphosphoric acid | 2.5 | 20 | 10 | 60 |
| Example 16 | 1100 | Alkaline degreasing | Sulfuric acid | 0.5 | Diphosphoric acid | 5 | 20 | 10 | 60 |
| Example 17 | 1100 | Alkaline degreasing | Sulfuric acid | 0.5 | Diphosphoric acid | 10 | 20 | 10 | 60 |
| Example 18 | 1100 | Alkaline degreasing | Sulfuric acid | 0.5 | Diphosphoric acid | 0.2 | 0 | 10 | 60 |
| Example 19 | 1100 | Alkaline degreasing | Sulfuric acid | 0.5 | Diphosphoric acid | 0.2 | 40 | 10 | 60 |
| Example 20 | 1100 | Alkaline degreasing | Sulfuric acid | 0.5 | Diphosphoric acid | 0.2 | 60 | 10 | 60 |
| Example 21 | 1100 | Alkaline degreasing | Sulfuric acid | 0.5 | Diphosphoric acid | 0.2 | 80 | 10 | 60 |
| Example 22 | 1100 | Alkaline degreasing | Sulfuric acid | 0.5 | Diphosphoric acid | 0.2 | 20 | 2 | 60 |
| Example 23 | 1100 | Alkaline degreasing | Sulfuric acid | 0.5 | Diphosphoric acid | 0.2 | 20 | 5 | 60 |
| Example 24 | 1100 | Alkaline degreasing | Sulfuric acid | 0.5 | Diphosphoric acid | 0.2 | 20 | 20 | 60 |
| Example 25 | 1100 | Alkaline degreasing | Sulfuric acid | 0.5 | Diphosphoric acid | 0.2 | 20 | 30 | 60 |
| Example 26 | 1100 | Alkaline degreasing | Sulfuric acid | 0.5 | Diphosphoric acid | 0.2 | 20 | 50 | 60 |
| Example 27 | 6063 | Alkaline degreasing | Sulfuric acid | 0.5 | Diphosphoric acid | 0.2 | 20 | 10 | 60 |
| Example 28 | 1100 | Alkaline degreasing | Sulfuric acid | 0.5 | Diphosphoric acid | 0.2 | 20 | 10 | 10 |

TABLE 1-continued

| | Type of mother material alloy | Substrate treatment | First acid or salt of first acid | | Second acid or salt of second acid | | Anodic oxidation treatment | | |
|---|---|---|---|---|---|---|---|---|---|
| | | | Material | Concentration (mol·dm⁻³) | Material | Concentration (mol·dm⁻³) | Liquid temperature (°C.) | Current density (mA·cm⁻²) | Electrolysis time (minutes) |
| Example 29 | 1100 | Alkaline degreasing | Sulfuric acid | 0.5 | Diphosphoric acid | 0.2 | 20 | 10 | 30 |
| Example 30 | 1100 | Alkaline degreasing | Sulfuric acid | 0.5 | Diphosphoric acid | 0.2 | 20 | 10 | 120 |
| Example 31 | 1100 | Alkaline degreasing | Sulfuric acid | 0.5 | Diphosphoric acid | 0.2 | 20 | 10 | 600 |
| Example 32 | 1100 | Alkaline degreasing | Sulfuric acid | 0.5 | Diphosphoric acid | 0.2 | 20 | 10 | 700 |
| Comparative Example 1 | 1100 | Alkaline degreasing | — | — | — | — | — | — | 5 |
| Comparative Example 2 | 1100 | Alkaline degreasing | — | — | Diphosphoric acid | 0.2 | 20 | 10 | 60 |
| Comparative Example 3 | 1100 | Alkaline degreasing | Sulfuric acid | 0.5 | — | — | 20 | 10 | 60 |

Measurement and evaluation described below were performed on the aluminum members obtained in Examples 1 to 32 and Comparative Examples 1 to 3. Measurement and evaluation results on these aluminum members are shown in Table 2. The Hunter whiteness, the unevenness in white color, the ascertainment of the first and second pores, and the BET specific surface area were measured as follows. With respect to "Determination" in Table 2, when the Hunter whiteness was 65 or more, and the unevenness in white color was "Fair" or "Good," the "Determination" was made as "Good," and in other cases, the "Determination" was made as "Poor."

<Hunter Whiteness>

L*a*b* specified in JIS Z8781-4:2013 and standardized in the International Commission on Illumination were measured for the obtained aluminum members with a colorimeter, and evaluated using Hunter whiteness to which L*a*b* were converted by the following equation (1).

$$\text{Hunter whiteness} = 100 - \{(100-L^*)^2 + a^{*2} + b^{*2}\}^{1/2} \quad (1)$$

<Unevenness in White Color>

The appearances of the samples of the Examples and the Comparative Examples after the anodic oxidation treatments were observed visually. When a sample was anodically oxidized in a uniform manner from the observation of the appearance, the sample was evaluated as "good," when the extent of the unevenness in white color was low, the sample was evaluated as "fair," and when a lot of unevenness in white color occurred or a sample was not anodically oxidized, the sample was evaluated as "poor."

<Specific Surface Area of Anodic Oxide Film>

The BET specific surface areas of the samples of the Examples and the Comparative Examples after the anodic oxidation treatments were measured using a BET specific surface area analyzer (BELSORP mini II: manufactured by MicrotracBEL Corp.).

<Ascertainment of First Pores and Second Pores>

Ascertainment of the existence or non-existence of the barrier layer, the porous layer, and the first pores and second pores in the porous layer was conducted utilizing results of observing the surface and section of each anodic oxide film using FE-SEM (SU-8230: manufactured by Hitachi High-Technologies Corporation). With respect to the observation of the section, cracks on the films which occurred by bending the samples of the Examples and the Comparative Examples after the anodic oxidation treatments each into a V shape were observed by being inclined.

TABLE 2

| | Appearance characteristics | | Porous layer | | BET specific | |
|---|---|---|---|---|---|---|
| | Unevenness in white color | Hunter whiteness | First pores | Second pores | surface area (m²/g) | Determination |
| Example 1 | Good | 85 | Exist | Exist | 1.76 | Good |
| Example 2 | Good | 74 | Exist | Exist | 0.48 | Good |
| Example 3 | Good | 72 | Exist | Exist | 0.43 | Good |
| Example 4 | Good | 86 | Exist | Exist | 1.79 | Good |
| Example 5 | Good | 85 | Exist | Exist | 1.01 | Good |
| Example 6 | Fair | 65 | Exist | Exist | 9.87 | Good |
| Example 7 | Good | 83 | Exist | Exist | 1.81 | Good |
| Example 8 | Good | 84 | Exist | Exist | 1.90 | Good |
| Example 9 | Good | 84 | Exist | Exist | 1.75 | Good |
| Example 10 | Good | 81 | Exist | Exist | 1.00 | Good |
| Example 11 | Fair | 90 | Exist | Exist | 8.05 | Good |
| Example 12 | Fair | 65 | Exist | Exist | 0.14 | Good |
| Example 13 | Good | 70 | Exist | Exist | 0.62 | Good |
| Example 14 | Good | 75 | Exist | Exist | 0.77 | Good |
| Example 15 | Good | 79 | Exist | Exist | 0.81 | Good |
| Example 16 | Good | 83 | Exist | Exist | 1.51 | Good |
| Example 17 | Good | 89 | Exist | Exist | 4.83 | Good |

TABLE 2-continued

| | Appearance characteristics | | Porous layer | | BET specific | |
|---|---|---|---|---|---|---|
| | Unevenness in white color | Hunter whiteness | First pores | Second pores | surface area (m²/g) | Determination |
| Example 18 | Good | 72 | Exist | Exist | 0.34 | Good |
| Example 19 | Good | 74 | Exist | Exist | 4.51 | Good |
| Example 20 | Good | 76 | Exist | Exist | 0.56 | Good |
| Example 21 | Good | 80 | Exist | Exist | 1.02 | Good |
| Example 22 | Fair | 65 | Exist | Exist | 0.12 | Good |
| Example 23 | Good | 70 | Exist | Exist | 0.32 | Good |
| Example 24 | Good | 75 | Exist | Exist | 0.66 | Good |
| Example 25 | Good | 80 | Exist | Exist | 0.97 | Good |
| Example 26 | Good | 90 | Exist | Exist | 5.98 | Good |
| Example 27 | Good | 84 | Exist | Exist | 5.22 | Good |
| Example 28 | Fair | 65 | Exist | Exist | 0.54 | Good |
| Example 29 | Good | 80 | Exist | Exist | 1.06 | Good |
| Example 30 | Good | 83 | Exist | Exist | 1.58 | Good |
| Example 31 | Good | 85 | Exist | Exist | 1.74 | Good |
| Example 32 | Good | 87 | Exist | Exist | 2.85 | Good |
| Comparative Example 1 | Poor | 60 | — | | 15 | Poor |
| Comparative Example 2 | Poor | 54 | Not exist | Not exist | 0.05 | Poor |
| Comparative Example 3 | Good | 58 | Exist | Not exist | 0.09 | Poor |

As shown in Tables 1 and 2, in the aluminum members of Examples 1 to 32 obtained by performing the anodic oxidation treatments on the mother materials containing an aluminum alloy in the electrolytic solutions containing both of the predetermined first acid or a salt of the first acid and the predetermined second acid or a salt of the second acid, the anodic oxide films each had a barrier layer formed on the surface of the mother material and a porous layer formed on the barrier layer, and further, the existence of both of the first pores and the second pores was ascertained in the porous layers. Further, in the aluminum members of Examples 1 to 32, the BET specific surface areas of the anodic oxide films were 0.10 to 10.00 m²/g, and the evaluations of the unevenness in white color were "fair" or "good." Therefore, in Examples 1 to 32, the aluminum members excellent in appearance characteristics could be obtained because the aluminum members have high whiteness, and the occurrence of the unevenness in white color was suppressed. Particularly in Examples 1 to 5, 7 to 10, 13 to 21, 23 to 27, and 29 to 32, aluminum having further improved appearance characteristics could be obtained because the aluminum members had higher hunter whiteness of 70 or more, and the occurrence of the unevenness in white color was further suppressed.

Figure 2:
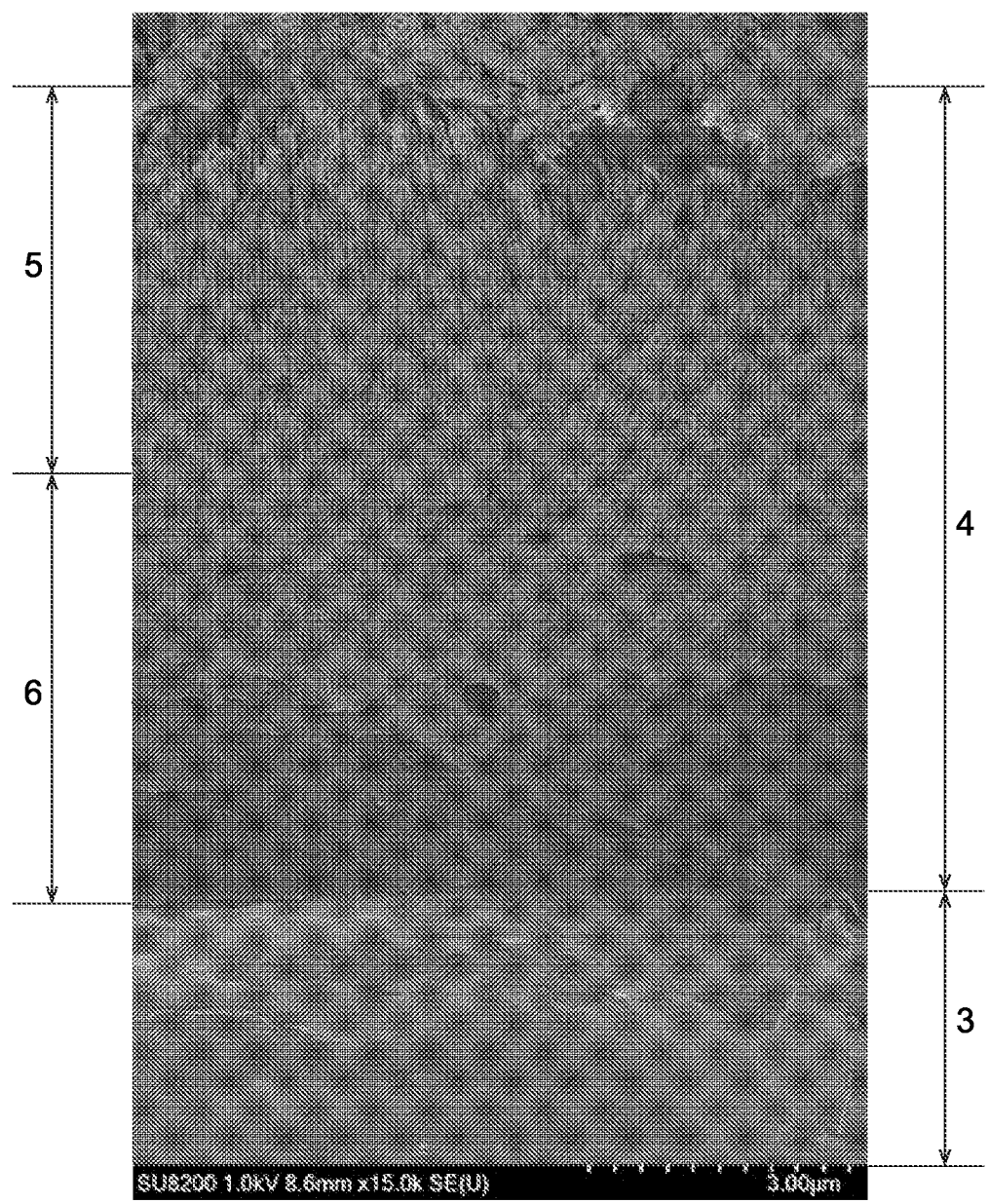
FIG. 2 is an image of a section of an anodic oxide film of an aluminum member obtained in Example 3, the image taken with a scanning electron microscope (SEM).

As one example of the ascertainment of the existence of the barrier layer, the porous layer, and the first pores and the second pores in the porous layer, FIG. 2 shows an image of the section of the anodic oxide film which the aluminum member manufactured in Example 3 had, the image taken with a scanning electron microscope (SEM). As shown in FIG. 2, the existence of the first pores 6 extending orthogonally to the surface of the barrier layer 3 was ascertained on the barrier layer side of the porous layer 4. In addition, the existence of the second pores 5 in the form of inverted dendroid spreading and extending radially in such a way as to communicate with the first pores 6 was ascertained on the surface side of the porous layer 4.

On the other hand, in Comparative Example 1, alkaline degreasing was only performed as a substrate treatment on the mother material using 5% by mass of NaOH, and an anodic oxidation treatment was not performed. Therefore, the mother material was not anodically oxidized, and thus the porous layer was not formed, the BET specific surface area was out of the range of the specification of the present disclosure, and the Hunter whiteness of the obtained aluminum member was low.

In Comparative Example 2, a substance corresponding to the predetermined first acid or a salt of the first acid was not contained in the electrolytic solution, and therefore the existence of the first pores and the second pores was not ascertained in the porous layer, and the BET specific surface area was out of the range of the specification of the present disclosure. Therefore, the Hunter whiteness was low, and a lot of unevenness in white color occurred.

In Comparative Example 3, a substance corresponding to the predetermined second acid or a salt of the second acid was not contained in the electrolytic solution, and therefore the existence of the second pores was not ascertained in the porous layer, and the BET specific surface area was out of the range of the specification of the present disclosure. In addition, the second pores were not formed in the porous layer, and therefore an aluminum member exhibiting a high Hunter whiteness could not be obtained.

What is claimed is:
1. An aluminum member comprising:
a mother material containing aluminum or an aluminum alloy; and
an anodic oxide film on a surface of the mother material, wherein
the anodic oxide film has a barrier layer on a surface of the mother material, and a porous layer on the barrier layer, and,
a BET specific surface area of the anodic oxide film is 0.1 to 10.0 m²/g,
wherein the porous layer comprises a first pore and second pore,
wherein the first pore extends from a boundary between the porous layer and the barrier layer in a thickness direction of the porous layer,
wherein the second pore communicates with the first pore and extends as to branch radially toward a surface of the porous layer opposite the boundary between the porous layer and the barrier layer, and wherein the second pore stretches by spreading in an inverted dendroid form along the thickness direction of the porous layer toward the surface of the porous layer.

2. The aluminum member according to claim 1, wherein a Hunter whiteness of the aluminum member, measured from a surface side of the anodic oxide fin, is 65 or more.

3. A method of manufacturing the aluminum member according to claim 1, comprising:
 a step of preparing a mother material comprising aluminum or an aluminum alloy; and
 a step of performing an anodic oxidation treatment on the mother material in an electrolytic solution including:
 (a) a first acid being an inorganic acid or a salt of the first acid;
 and (b) at least one second acid selected from the group consisting of diphosphoric acid, triphosphoric acid, and polyphosphoric acid, or a salt of the second acid.

4. The method of manufacturing the aluminum member according to claim 3, wherein in the step of performing the anodic oxidation treatment,
 a concentration of the first acid or a salt of the first acid in the electrolytic solution is 0.005 to 7.0 mol·dm$^{-3}$, and
 a concentration of the second acid or a salt of the second acid in the electrolytic solution is 0.005 to 10.0 mol·dm$^{-3}$.

5. The method of manufacturing the aluminum member according to claim 3, wherein in the step of performing the anodic oxidation treatment,
 a current density is 2 to 150 mA·cm$^{-2}$, and an electrolysis time is 10 to 700 minutes.

6. The aluminum member of claim 1, wherein a thickness of the anodic oxide film is 100 μm or less.

7. The aluminum member of claim 1, wherein a thickness of the barrier layer is 10 to 150 nm.

8. The aluminum member of claim 1, wherein the first pore lies in vicinity of the boundary, and wherein the second pore lies in vicinity of the surface of the porous layer.

9. The aluminum member of claim 1, wherein a thickness of porous layer is 6 μm or more and less than 100 μm.

10. The aluminum member of claim 1, wherein the BET specific surface area of the anodic oxide film is 0.1 to 8.0 m$^2$/g.

11. The aluminum member of claim 1, wherein the BET specific surface area of the anodic oxide film is 0.5 to 8.0 m$^2$/g.

* * * * *